(12) United States Patent
Wang et al.

(10) Patent No.: US 9,303,182 B2
(45) Date of Patent: Apr. 5, 2016

(54) AQUEOUS COATING COMPOSITION WITH IMPROVED STABILITY

(75) Inventors: Tao Wang, Shanghai (CN); Junyu Chen, Shanghai (CN); Tao Wang, Highton (AU); Yujiang Wang, Shanghai (CN); Longlan Cui, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/405,835

(22) PCT Filed: Jun. 5, 2012

(86) PCT No.: PCT/CN2012/076475
§ 371 (c)(1),
(2), (4) Date: Dec. 5, 2014

(87) PCT Pub. No.: WO2013/181793
PCT Pub. Date: Dec. 12, 2013

(65) Prior Publication Data
US 2015/0152282 A1  Jun. 4, 2015

(51) Int. Cl.
*C08K 9/00* (2006.01)
*C09D 133/14* (2006.01)
*C09D 151/00* (2006.01)
*C08K 3/22* (2006.01)
*C08K 3/36* (2006.01)
*C09D 125/14* (2006.01)
*C09D 131/04* (2006.01)

(52) U.S. Cl.
CPC ............... *C09D 133/14* (2013.01); *C08K 3/22* (2013.01); *C08K 3/36* (2013.01); *C09D 125/14* (2013.01); *C09D 131/04* (2013.01); *C09D 151/003* (2013.01); *C08K 2003/2241* (2013.01)

(58) Field of Classification Search
CPC ....... C08K 3/36; C09D 133/36; C09D 133/12
USPC ................................. 524/555, 561
See application file for complete search history.

(56) References Cited

U.S. PATENT DOCUMENTS

| 2,630,410 | A | 3/1953 | Clapsadle et al. | |
|---|---|---|---|---|
| 5,360,827 | A | 11/1994 | Toda et al. | |
| 5,368,833 | A | 11/1994 | Johansson et al. | |
| 6,380,265 | B1 * | 4/2002 | Pryor et al. | 516/85 |
| 6,869,996 | B1 | 3/2005 | Krajnik et al. | |
| 7,357,949 | B2 | 4/2008 | Trogolo et al. | |
| 7,511,090 | B2 | 3/2009 | Wiese et al. | |
| 7,544,726 | B2 | 6/2009 | Greenwood | |
| 7,579,081 | B2 | 8/2009 | Brown | |
| 8,987,350 | B2 * | 3/2015 | Li et al. | 523/205 |
| 2002/0071948 | A1 | 6/2002 | Duff et al. | |
| 2002/0173561 | A1 | 11/2002 | Field | |
| 2004/0077768 | A1 | 4/2004 | Greenwood | |
| 2006/0009546 | A1 | 1/2006 | Brown | |
| 2008/0071011 | A1 | 3/2008 | Lamers et al. | |
| 2008/0233062 | A1 | 9/2008 | Krishnan | |
| 2009/0111910 | A1 | 4/2009 | Gimvang | |
| 2009/0149591 | A1 | 6/2009 | Yang et al. | |
| 2010/0063171 | A1 | 3/2010 | Roschmann et al. | |
| 2010/0256260 | A1 * | 10/2010 | Liu et al. | 523/206 |
| 2011/0065834 | A1 * | 3/2011 | Ganapathiappan et al. | 523/205 |
| 2012/0083552 | A1 | 4/2012 | Ma | |
| 2012/0129965 | A1 | 5/2012 | Tuchbreiter et al. | |
| 2012/0142850 | A1 | 6/2012 | Muhlebach et al. | |

FOREIGN PATENT DOCUMENTS

| EP | 0404184 A2 | 12/1990 |
|---|---|---|
| EP | 0820477 A2 | 1/1998 |
| EP | 0959176 A1 | 11/1999 |
| GB | 2111522 A | 7/1983 |
| JP | 2008105919 A | 5/2008 |
| WO | 0068304 A1 | 11/2000 |
| WO | 2006037161 A1 | 4/2006 |
| WO | 2010074865 A1 | 7/2010 |

OTHER PUBLICATIONS

Iler, R.K. & Dalton, R. L.; Journal of Physcial Chemistry; 60 (1956) pp. 955-957.
Iler, R. K. The Chemistry of Silica ,John Wiley & Sons (1979), pp. 407-409.

* cited by examiner

*Primary Examiner* — Hannah Pak
(74) *Attorney, Agent, or Firm* — Karl E. Stauss; Cantor Colburn LLP

(57) ABSTRACT

This invention relates to a coating composition, especially, relates to an aqueous coating composition with improved stability.

13 Claims, No Drawings

AQUEOUS COATING COMPOSITION WITH IMPROVED STABILITY

FIELD

This invention relates to a coating composition, especially, relates to an aqueous coating composition with improved stability.

BACKGROUND

Colloidal silica is composed of ultra fine silicon dioxide particles dispersed in water/solvent. It could generate super dirt pick up resistance (DPUR), hardness, stain blocking, etc for the dried/cured paint film. Colloidal silica dispersions have been used for a long time, e.g. as a coating material to improve adhesive properties as well as increasing wear and water resistance of various materials. However, these dispersions, especially highly concentrated colloidal silica dispersions, are liable to gelling or precipitation of silica, which makes longer storage impossible.

U.S. Pat. No. 7,544,726B2 disclosed a method of producing a stable substantially aqueous silanized colloidal silica dispersion having a silica content of at least about 20 wt % comprising mixing at least one silane compound and colloidal silica particles, wherein the weight ratio of silane to silica is from about 0.003 to about 0.2, preferably from about 0.006 to about 0.15, and most preferably from about 0.015 to about 0.1. This method is complicated and with high cost.

It is therefore, still desired in the art to get to a novel aqueous coating composition, especially, aqueous coating composition that has better stability comparing to prior art colloidal silica comprising coatings.

STATEMENT OF INVENTION

The present invention provides an aqueous coating composition comprising: i) a stable aqueous dispersion of polymer particles having structural units of an ethylenically unsaturated nonionic monomer; ii) from 5% to 50% at least one pigment by dry weight based on the total weight of the coating composition, wherein the pigment comprises from 30% to 100% based on the total weight of the pigment, a polymer-encapsulated pigment; and iii) from 2% to 25% by dry weight based on the total weight of the coating composition, at least one colloidal silica.

The encapsulating polymer of the polymer-encapsulated pigment has an average shell thickness of 10 nanometers to 200 nanometers; and a minimum film formation temperature (MFFT) from −35° C. to 60° C. The encapsulating polymer of the said polymer-encapsulated pigment is comprised of at least one copolymerized ethylenically unsaturated nonionic monomer.

The pigment is an inorganic pigment.

DETAILED DESCRIPTION

For the purpose of describing the components in the compositions of the present invention, all phrases comprising parenthesis denote either or both of the included parenthetical matter and its absence. For example, the phrase "(co)polymer" includes, in the alternative, polymer, copolymer and mixtures thereof; the phrase "(meth)acrylate" means acrylate, methacrylate, and mixtures thereof.

As used herein, the term "aqueous" shall mean water or water mixed with 50 wt % or less, based on the weight of the mixture, of water-miscible solvent.

As used herein, the term "polymer" shall include resins and copolymers.

As used herein, the term "acrylic" shall mean (meth)acrylic acid, (meth)alkyl acrylate, (meth)acrylamide, (meth)acrylonitrile and modified forms thereof, such as, for example, (meth)hydroxyalkyl acrylate.

As used herein, unless otherwise indicated, the term "average particle size (or diameter)" refers to the median particle size (or diameter) of a distribution of particles as determined by electrical impedance using a MULTISIZER™ 3 Coulter Counter (Beckman Coulter, Inc., Fullerton, Calif.), per manufacturer's recommended procedures. The median is defined as the size wherein 50 wt % of the particles in the distribution are smaller than the median and 50 wt % of the particles in the distribution are larger than the median. This is a volume average particle size.

As used herein, unless otherwise indicated, the term "Tg" shall mean glass transition temperature measured by differential scanning calorimetry (DSC) using a heating rate of 20° C./minute and taking the inflection point in the thermogram as the Tg value. The term "calculated Tg" refers to the Tg of polymers determined via the Fox equation (T. G. Fox, Bull. Am. Physics Soc., Volume 1, Issue No. 3, page 123(1956)). The Tgs of homopolymers may be found, for example, in "Polymer Handbook", edited by J. Brandrup and E. H. Immergut, Interscience Publishers. In the case of a multi-stage polymer, the reported Tg value shall be the weighted average of the observed inflection points in the thermogram. For example, a two stage polymer consisting of 80% soft first stage and 20% hard second stage polymer having two DSC inflection points, one at −43° C. and one at 68° C., will have a reported Tg of −20.8° C.

The aqueous coating composition with good stability in the present invention comprises a pigment composition. The aqueous coating composition has a pigment volume concentration of from 15% to 95%, preferably from 20% to 70%, most preferably from 30% to 60%.

The coating composition of the present invention comprises from 5% to 50%, preferably from 5% to 40%, and most preferably from 5% to 30%, by dry weight based on the total weight of the coating composition, at least one pigment.

The pigment comprises from 30% to 100%, preferably from 50% to 100%, and most preferably from 70% to 100%, based on the total weight of the pigment, a polymer-encapsulated pigment.

The pigment may or may not further comprise an un-encapsulated pigment. In the embodiments that un-encapsulated pigment is comprised, its amount of usage is from 0.1% to 70%, preferably from 0.1% to 50%, and most preferably from 0.1% to 30% based on the total weight of the pigment.

The pigment particles, as encapsulated and/or un-encapsulated, are inorganic pigment. As used herein, the term "inorganic pigment" refers to a particulate inorganic material which is capable of materially contributing to the opacity or hiding capability of a coating. Such materials typically have a refractive index of greater than 1.8 and include, but not limited to, titanium dioxide ($TiO_2$), zinc oxide, zinc sulfide, barium sulfate, barium carbonate and lithopone. Preferred is titanium dioxide ($TiO_2$).

In a preferred embodiment where the pigment is $TiO_2$, the $TiO_2$ in the polymer-encapsulated $TiO_2$ has a weight percent to the total $TiO_2$ in the aqueous coating composition of 30% to 100%, preferably from 50% to 100%, and most preferably from 70% to 100%.

Extenders as polymer-encapsulated or un-encapsulated might also be comprised in the coating composition of the present invention. Preferably, they are not encapsulated. The term "extender" refers to a particulate inorganic material having a refractive index of less than or equal to 1.8 and greater than 1.3 and includes, for example, calcium carbonate, clay, calcium sulfate, aluminosilicates, silicates, colloidal silica, zeolites, mica, diatomaceous earth, solid or hollow glass, and ceramic beads. The aqueous coating composition may optionally contain solid or hollow polymeric particles having a Tg of greater than 60° C., such polymeric particles are classified as extenders for purposes of PVC calculations herein. The details of hollow polymeric particles are described in EP22633, EP915108, EP959176, EP404184, U.S. Pat. No. 5,360,827, WO 00/68304, and US20100063171. The solid polymeric particles have particle size from 1-50 microns, preferably from 5-20 microns.

The encapsulating polymer of the polymer-encapsulated pigment comprises, at least one copolymerized ethylenically unsaturated nonionic monomer. Herein, "nonionic monomer" means that the copolymerized monomer residue does not bear an ionic charge between pH=1-14. The ethylenically unsaturated nonionic monomers used in the present invention include, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

Preferably, the encapsulating polymer of the polymer-encapsulated pigment of the present invention further comprises from 0.1% to 10%, preferably from 0.1% to 5%, by weight based on the dry weight of the copolymer, an ethylenically unsaturated monomer carrying at least one functional group selected from carboxyl, carboxylic anhydride, hydroxyl, amide, sulphonate, phosphonate and mixtures thereof. Examples of these types of monomers are ethylenically unsaturated carboxylic or dicarboxylic acids, especially acrylic or methacrylic acid, itaconic acid, maleic acid, or the amides, especially N-alkylolamides or hydroxyalkyl esters of the above-mentioned carboxylic acids, such as (meth)acrylamide, N-methylol(meth)acrylamide, 2-hydroxyethyl(meth)acrylamide, hydroxyethyl(meth)acrylate, and hydroxypropyl (meth)acrylate.

The encapsulating polymer of the polymer-encapsulated pigment may further comprises, in percentage by weight based on the dry weight of the said encapsulating polymer, from 0.1% to 5%, preferably from 0.1% to 3%, a surfactant to stabilize the growing polymer-encapsulated pigments during polymerization and to discourage aggregation of the polymer-encapsulated pigments in the resulting aqueous dispersion. One or more surfactants, including anionic and nonionic surfactants, and mixtures thereof, are commonly used. Many examples of surfactants suitable for emulsion polymerization are given in McCutcheon's Detergents and Emulsifiers (MC Publishing Co. Glen Rock, NF), published annually. Other types of stabilizing agents, such as protective colloids, are optionally used.

The encapsulating polymer of the polymer-encapsulated pigment could also be comprised of other film formable polymers, like but not limited to polyurethane, epoxy resin, alkyd resin, or polyurethane-acrylic hybrid.

Preferably, the hydrophilic monomers used in the encapsulating polymer of the polymer-encapsulated pigment are less than 15%, based on the total amount of the encapsulating polymer monomers.

In one embodiment of the present invention, the encapsulating polymer of the said polymer-encapsulated pigment has an average shell thickness of 10 nanometers to 200 nanometers, preferably from 30 to 150 nanometers, more preferably from 40 to 120 nanometers. SEM and TEM images can accurately measure the shell thickness.

In another embodiment of the present invention, the encapsulating polymer of the said polymer-encapsulated pigment has a minimum film formation temperature (MFFT) from −35° C. to 60° C., preferably from −20° C. to 40° C., and more preferably from −15° C. to 30° C. The MFFT measurement is carried out by drawing down a film of the dispersion onto a metal bar subjected to a thermal gradient and then passing dry air over the dispersion until the film is dry. The MFFT is taken to be the minimum temperature where one observes a clear and crack-free film. It is not uncommon in the coatings industry to assume that a substantial extent of polymer diffusion takes place at temperatures above but not far removed from the MFFT.

Conventional free radical initiators may be included such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and C4-C22 linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous emulsion copolymer. A preferred level of chain transfer agent is from 0.01 to 0.5, more preferably from 0.02 to 0.4 and most preferably from 0.05 to 0.2 mole %, based on the total number of moles of monomer used to form the aqueous emulsion copolymer.

The encapsulating polymer, particle size, particle morphology and process to make such are described, un-exclusively, in for example U.S. Pat. No. 7,579,081 B2; WO2006/037161A1; WO2010/074865 A1; JP2008105919A;

GB2111522A. The preparation methods of the polymer-encapsulated pigment of the coating composition of the present invention can be any methods, familiar to the technical persons in the art. General methods include emulsion polymerization, mini-emulsion polymerization, and mechanical dispersing technology, etc. Suitable examples include, but not limited to those as disclosed in U.S. Pat. No. 7,579,081 B2, U.S. Pat. No. 7,357,949 B2, and WO 2010074865 A1. Preferably, polymer-encapsulated pigments are made by emulsion polymerization as taught in U.S. Pat. No. 7,579,081 B2 and WO2006/037161A1.

The aqueous dispersion of the polymer-encapsulated pigment can further comprise functional substances, like crosslinking agent, biocide, UV absorption agent, and others. The crosslinking agent could be similar to, but not limited to, the one disclosed in U.S. Pat. No. 6,869,996 B1, the one disclosed in EP0820477, or the one disclosed in U.S. Pat. No. 5,609,965.

The existence of the polymer-encapsulated pigment is preferred to be an aqueous dispersion. It could also be powder, or other which can be dispersed in the water per paint making and keep stable. The aqueous dispersion of the polymer-encapsulated pigment can further comprise functional substances, like crosslinking agent, biocide, UV absorption agent, and others. The crosslinking agent could be similar to, but not limited to, the one disclosed in U.S. Pat. No. 6,869,996 B1, the one disclosed in EP0820477, or the one disclosed in U.S. Pat. No. 5,609,965.

The aqueous coating composition of the present invention further comprises from 2% to 25%, preferably from 4% to 20%, most preferably from 5% to 15%, in percentage by dry weight based on the total weight of the composition, colloidal silica particles.

Colloidal silica particles, which here also are referred to as silica sols, may be derived from e.g. precipitated silica, micro silica (silica fume), pyrogenic silica (fumed silica) or silica gels with sufficient purity, and mixtures thereof.

Colloidal silica particles according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, preferably from about 0.1 to about 2 wt %. The procedure of preparing an aluminium modified colloidal silica is further described in e.g. "The Chemistry of Silica", by Iler, K. Ralph, pages 407-409, John Wiley & Sons (1979) and in U.S. Pat. No. 5,368,833.

The colloidal silica particles suitably have an average particle diameter ranging from about 2 to about 150 nm, preferably from about 3 to about 50 nm, and most preferably from about 5 to about 40 nm. Suitably, the colloidal silica particles have a specific surface area from about 20 to about 1500, preferably from about 50 to about 900, and most preferably from about 70 to about 600 $m^2/g$.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The colloidal silica particles are dispersed in a substantially aqueous solvent, suitably in the presence of stabilising cations such as $K^+$, $Na^+$, $Li^+$, $NH_4^+$, organic cations, primary, secondary, tertiary, and quaternary amines, and mixtures thereof so as to form an aqueous silica sol. However, also dispersions comprising organic solvents miscible with water, e.g. lower alcohols, acetone or mixtures thereof may be used, preferably in an amount of from about 1 to about 20, more preferably from about 1 to about 10, and most preferably from about 1 to about 5 volume percent of the total volume. However, aqueous silica sols without any further solvents are preferably used. Preferably, the colloidal silica particles are negatively charged. Suitably, the silica content in the sol is from about 10 to about 60, preferably from about 20 to about 50, and most preferably from about 30 to about 45 wt %. The higher the silica content, the more concentrated the resulting colloidal silica dispersion. The pH of the colloidal silica suitably is from about 1 to about 13, preferably from about 6 to about 12, and most preferably from about 7.5 to about 11. However, for aluminium-modified silica sols, the pH suitably is from about 1 to about 12, preferably from about 3.5 to about 11.

The colloidal silica preferably has an S-value from about 20 to about 100, more preferably from about 30 to about 90, and most preferably from about 60 to about 90.

It has been found that dispersions with an S-value within these ranges can improve the stability of the resulting dispersion. The S-value characterises the extent of aggregation of colloidal silica particles, i. e. the degree of aggregate or microgel formation. The S-value has been measured and calculated according to the formulas given in J. Phys. Chem. 60(1956), 955-957 by Iler, R. K. & Dalton, R. L.

The S-value depends on the silica content, the viscosity, and the density of the silica sol. A high S-value indicates a low microgel content. The S-value represents the amount of $SiO_2$ in percent by weight present in the dispersed phase of the silica sol. The degree of microgel can be controlled during the production process as further described in e.g. U.S. Pat. No. 5,368,833.

The colloidal silica is gradually added to polymer with agitation or polymer is gradually added to the colloidal silica. The polymer is mixed with colloidal silica particles in a weight ratio of polymer to silica 0.2 to 5, more preferably from about 0.5 to 3, and most preferably from about 1 to 2. The mixture temperature preferred from 0 to 50° C., more preferred from 20 to 40° C.

The aqueous coating composition, in addition to the polymer encapsulating the polymer-encapsulated pigment, may also contain one or more additional water dispersible or soluble polymers, with an average particle diameter of from 50 to 800 nm and a minimum film formation temperature of from −35° C. to 60° C. The aqueous coating composition has a polymer volume concentration of from 5% to 85, preferably from 30% to 80%, and most preferably from 40% to 70%.

The water dispersible or soluble polymers are copolymerized from the ethylenically unsaturated monomer wherein the ethylenically unsaturated monomers used in the present invention include but not limited to, for example, (meth) acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylic acid, (meth)acrylonitrile; (meth)acrylamide; amino-functional and ureido-functional monomers; monomers bearing acetoacetate-functional groups; monomer bearing epoxy group; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride, vinylidene chloride.

Said water dispersible or soluble polymer could also be epoxy polymer, poly urethane dispersion, polyurethane acrylic hybrid, alkyd polymer, hybrids or blends between those polymers. Inorganic/organic hybrids or inorganic binder like acid form or neutralized silica sol and organic modified silica sol also can be blended in the aqueous coating composition of current invention.

Said water dispersible polymer is in a form of aqueous polymer latex.

The aqueous coating composition of the present invention contains at least one conventional coatings adjuvant, including but not limited to, coalescing agents, cosolvents, surfactants, buffers, neutralizers, thickeners, non-thickening rheology modifiers, dispersants, humectants, wetting agents, midewcides, biocides, plasticizers, antifoaming agents, defoaming agents, anti-skinning agents, colorants, flowing agents, crosslinkers, anti-oxidants.

Thickeners for use herein include but not limited to polyvinyl alcohol (PVA), hydrophobically modified alkali soluble emulsions (HASE), alkali-soluble or alkali swellable emulsions (ASE), hydrophobically modified ethylene oxide-urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose. Also useful as thickeners are fumed silica, attapulgite clay and other types of clay, titanate chelating agents.

Dispersants for use herein include non-ionic, anionic and cationic dispersants such as polyacid with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. Prefer the polyacids with suitable molecular weight. The polyacids used here are such as homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof. The molecular weight of such polyacids dispersant is from 400 to 50,000, or from 400 to 30,000, prefer 500 to 10,000, more prefer 1,000 to 5,000 and most prefer 1,500 to 3,000.

Antifoaming agents and/or defoaming agents for use herein include but not limited to silicone-based and mineral oil-based defoamers. Surfactants for use herein include anionic, nonionic, cationic surfactants and amphiphilic surfactant. Prefer anionic and nonionic surfactants and more prefer nonionic surfactant.

Suitable coalescing agents, plasticizers, and other optional cosolvents include but not limited to ethylene glycol, propylene glycol, hexylene glycol, 2,2,4-trimethyl-1,3-pentanediol monoisobutyrate (TEXANOL™), Coasol™, glycol ethers, mineral spirits, methyl carbitol, butylcarbitol, phthalates, adipates.

The aqueous coating composition formulating involves the process of selecting and admixing appropriate coating ingredients in the correct proportions to provide a paint with specific processing and handling properties, as well as a final dry paint film with the desired properties.

The aqueous coating composition may be applied by conventional application methods such as, for example, brushing, roller application, and spraying methods such as, for example, air-atomized spray, air-assisted spray, airless spray, high volume low pressure spray, and air-assisted airless spray.

Suitable substrates include, but not limited to, for example, concrete, cement board, MDF and particle board, gypsum board, wood, stone, metal, plastics, wall paper and textile, etc. preferably, all the substrate are pre-primed by waterborne or solvent borne primers.

The aqueous coating composition and its application method may influence the effectivity of this patent. When the hydrophilic substances in aqueous coating compositions are too much, then the property of the liquid stain repellency is poor. Similarly, in its application, when the concentration of hydrophilic substances on the dry paint film surface is too much, the property of the liquid stain repellency is poor.

EXAMPLES

I. Raw Materials

TABLE 1

| A) Materials used in making Polymer compound | |
|---|---|
| Compound | Chemical Nature |
| SEM | 2-sulfoethyl methacrylate |
| DMAEMA | 2-(Dimethylamino)ethyl Methacrylate |
| n-DDM | n-dodecyl mercaptan |
| AIBN | 2,2'-azobis(isobutyronitrile) |
| DS-4 | Sodium Dodecyl Benzene Sulfonate |
| t-BHP | tert-Butyl hydroperoxide |
| EDTA | Ethylene Diamine Tetraacetic Acid |
| BA | Butyl Acrylate |
| MMA | Methyl Methacrylate |
| MAA | Methacrylic Acid |
| SSS | Sodium Styrene sulfonate |
| ST | Styrene |
| VA | vinyl acetate |

| B) Starting materials used in paint formulation | | | |
|---|---|---|---|
| Material | Function | Chemical nature | Supplier |
| Tego ™ Foamex 825 | Defoamer | Polyether siloxane copolymer | Evonik Industries AG |
| Propylene Glycol | Solvent | Propylene glycol | Sinopharm Chemical Reagent Co., Ltd |
| AMP-95 | Base | 2-methyl-2-amino-propanol | Dow Chemical Company |
| Orotan ™ 731A | dispersant | Hydrophobic copolymer | Dow Chemical Company |
| Triton ™ EF-106 | Wetting agent | Nonionic surfactant | Union Carbide Corporation |
| Acrysol ™ DR-72 | Rheology Modifier | Hydrophobically modified polyacid | Dow Chemical Company |
| Natrosol 250 HBR | Rheology Modifier | Hydroxyethyl Cellulose | Ashland Inc. |
| Ammonia (28%) | Base | Ammonia | Sinopharm Chemical Reagent Co., Ltd |
| NS-30 | Extender | Colloidal silica | ZHEJIANG YUDA CHEMICAL INDUSTRY CO., LTD |
| Bindzil ® CC-40 | Extender | Colloidal silica | Eka Chemical |
| Bindzil ® 40/130 | Extender | Colloidal silica | Eka Chemical |
| Ti-Pure ™ R-706 | Pigment | Titanium dioxide | E. I. du Pont de Nemours and Company |
| CC-700 | Extender | Calcium carbonate | Guangfu Building Materials Group (China) |

TABLE 1-continued

| Texanol™ | Coalescent | Trimethyl-pentanediol isobutyrate | Eastman Chemical Company |
|---|---|---|---|

II. Test Procedures

Viscosity

The Stormer viscometer is used as an indication of low to mid shear viscosity. It is a commonly used instrument in the paint industry and gives us a common reference value when referring to recommended formulations. We measure Stormer viscosity a) just after the paint is made (initial high sheared), b) after at least 16 hours and hand stirred (equilibrated hand sheared).

Heat Age Stability

Heat Age Stability, the ability of aqueous polymeric lattices and formulated materials to resist drastic change in viscosity, is determined observing their physical condition and properties after conditioning for ten days in a 50° C. oven.

III. Experimental Examples

Example 1

Preparation of Water-Soluble Sulfur Acid Functional First Polymer

A 250 ml flask equipped with a magnetic stirrer, $N_2$-inlet, reflux condenser, heating mantel, and thermocouple was charged with 20 g of SEM, 4 g of DMAEMA, 10 g of BA, 16 g of MMA, 1.1 g of n-DDM, 0.5 g of AIBN, and 100 g of n-propanol. The flask was purged with $N_2$, and heated to 60° C., at which point the heating mantel was turned off and the reaction mixture was allowed to exotherm to 80° C. The heating mantel was turned back on and the reaction mixture was held at 80° C. for 3 hours. The temperature was then raised to 93° C., and 0.25 g of AIBN in 2.0 g n-propanol was added. The temperature was held at 93° C. for 1 hr; then the flask was cooled to room temperature. The product was poured into 100 ml of hexane, and then the solid polymer was collected and dried. The dried polymer was dissolved in sufficient water and $NH_3$ to make a 21.3% solution at pH 5.0.

Example 2

Formation of Opacifying Pigment Dispersion

A steel grind pot was charged with 31.7 g of Example 1 and 95.2 g water. 450 g $TiO_2$ (TIPURE™ R-706) was added slowly while grinding at 2000 rpm using a Premier Mill Corp. Model 50 dispersator equipped with a disk blade. After addition of the $TiO_2$, the slurry was ground for 20 min; then an additional 11.3 g of water was added. The solids were 76.5%.

Example 3

Formation of Polymer Encapsulated Pigment Particles

To a 1 gallon four neck round bottom flask equipped with paddle stirrer, $N_2$-inlet condenser, heating mantel, and thermocouple was charged with 1816 g Example 2 along with a solution of 13.81 g DS-4 (23% solid) in 251.05 g DI water. The flask was purged with $N^2$, the temperature is in 30° C. Then 50 g 0.1% iron sulfate and 4 g 1% EDTA was added into reactor. Two minute later co-feed #1 consisting of 2 g t-BHP dissolved in 110.53 g DI water and co-feed #2 consisting of 8.28 g IAA dissolved in 96.25 g DI water was fed to the reactor. Two minutes after the start of the co-feed solutions, a monomer emulsion (ME1) prepared previously by mixing 56.52 g DI water, 6.9 g DS-4, and 261.67 g monomers (monomers and their ratios refer to the encapsulating polymer composition in table 2) was fed to the reactor. When ME1 was complete, a second monomer emulsion (ME2) was prepared by mixing 269.5 g DI water, 20.71 g DS-4, and 779.5 g monomers (monomers and their ratios are the same with those in ME2 and refer to the encapsulating polymer composition in table 2) was fed to the reactor. Upon the completion of the ME2 feed the co-feeds were continued for another 20 min until completion. The contents of the reactor were then cooled to room temperature, followed by 84 g NaOH solution (6% solid) feeding into reactor for 40 min. Small amounts of gel were filtered in a 100 mesh filter.

Example 4

Composition of Aqueous Dispersion of Polymer Encapsulated Pigment

TABLE 2

| Dispersion ID | Encapsulating Polymer Composition | Dispersion Characteristics | | |
|---|---|---|---|---|
| | | $WS^a$ (%) | $PLT^b$ (nm) | $PVC^c$ (%) |
| 1 | 66VA/33BA/1MAA | 59.9% | 139.5 | 26.4 |
| 2 | 46BA/53MMA/1MAA | 58.6% | 85.0 | 26.4 |
| 3 | 60BA/19.5MMA/19.5Styrene/1.0MAA | 60.0% | 101.5 | 26.4 |

$^a$WS = weight solids
$^b$PLT = polymer layer thickness
$^c$PVC = pigment volume concentration
The pigment encapsulated is TiPure™ R-706.

Example 5

Composition of Aqueous Polymer Latex

TABLE 3

| Latex ID | Emulsion Polymer Composition | Latex Characteristics | | |
|---|---|---|---|---|
| | | WS (%) | $PS^d$ (nm) | $pH^e$ |
| 1 | 66.0VA/33.0BA/1.0MAA | 55% | 300 | 5.6 |
| 2 | 46.0BA/53.0MMA/1.0MAA | 50% | 105 | 8.0 |
| 3 | 60.0BA/19.5MMA/19.5Styrene/1.0MAA | 50% | 102 | 6.4 |

$^d$PS = particle size
$^e$pH = pH of the latex after neutralization

Latexes are used in comparative paints for PVC controlling.

Paint 1

A paint containing aqueous dispersion of polymer-encapsulated pigment Dispersion 1 was prepared using the following procedure to form the aqueous coating composition Paint 1. The ingredients listed in Table 4 (let down) were added using a conventional lab mixer. The PVC of the resulting paint is 25%.

TABLE 4

25% PVC Aqueous Coating Composition

| Material | Weight(g) |
|---|---|
| *Paint 1 Formulation* | |
| Letdown | |
| Water | 55.42 |
| Propylene Glycol | 5.54 |
| Natrosol 250 HBR | 6.62 |
| AMP-95 | 4.41 |
| Bindzil ® 40/130 | 144.09 |
| Dispersion 1 | 441.13 |
| Latex 1 | 132.34 |
| Texanol | 15.87 |
| Tego ™ Foamex 825 | 2.44 |
| Water | 192.15 |
| Total | 1000.00 |
| *Paint characteristics* | |
| PVC | 25% |

Paint 2 (Comparative Paint)

A paint containing no polymer-encapsulated pigment was prepared using the following procedure to form the aqueous coating composition Paint 2. The ingredients listed in Table 5 (grind) were mixed using a high speed Cowles disperser. The ingredients listed in Table 5 (let down) were added using a conventional lab mixer. The PVC of the resulting paints is 25%.

TABLE 5

25% PVC Aqueous Coating Composition

| Material | Weight(g) |
|---|---|
| *Paint 2 Formulation* | |
| Letdown | |
| Water | 132.47 |
| Propylene Glycol | 5.54 |
| Natrosol 250 HBR | 6.62 |
| AMP-95 | 4.41 |
| Orotan ™ 731A | 5.84 |
| Ti-Pure ™ R-706 | 145.57 |
| Bindzil ® 40/130 | 144.09 |
| Latex 1 | 345.00 |
| Texanol | 15.87 |
| Tego ™ Foamex 825 | 2.44 |
| Water | 192.15 |
| Total | 1000.00 |
| *Paint characteristics* | |
| PVC | 25% |

Paint 3

A paint containing aqueous dispersion of polymer-encapsulated pigment Dispersion 2 was prepared using the following procedure to form the aqueous coating composition Paint 3. The ingredients listed in Table 6 (grind) were mixed using a high speed Cowles disperser. The ingredients listed in Table 6 (let down) were added using a conventional lab mixer. The PVC of the resulting paints is 45%.

TABLE 6

45% PVC Aqueous Coating Composition

| Material | Weight(g) |
|---|---|
| *Paint 3 Formulation* | |
| Grind | |
| Water | 54.86 |
| Propylene Glycol | 6.05 |
| Orotan ™ 731A | 8.00 |
| Triton ™ EF-106 | 2.42 |
| Acrysol ™ DR-72 | 9.84 |
| Ammonia (28%) | 1.09 |
| CC-700 | 120.90 |
| NS-30 | 157.17 |
| Letdown | |
| Dispersion 2 | 604.52 |
| Texanol | 12.09 |
| Tego ™ Foamex 825 | 1.21 |
| Water | 21.86 |
| Total | 1000.00 |
| *Paint characteristics* | |
| PVC | 45% |

Paint 4 (Comparative Paint)

A paint containing no polymer-encapsulated pigment was prepared using the following procedure to form the aqueous coating composition Paint 4. The ingredients listed in Table 7 (grind) were mixed using a high speed Cowles disperser. The ingredients listed in Table 7 (let down) were added using a conventional lab mixer. The PVC of the resulting paints is 45%.

TABLE 7

45% PVC Aqueous Coating Composition

| Material | Weight(g) |
|---|---|
| *Paint 4 Formulation* | |
| Grind | |
| Water | 137.53 |
| Propylene Glycol | 6.05 |
| Orotan ™731A | 16.00 |
| Triton ™ EF-106 | 2.42 |
| Acrysol ™ DR-72 | 9.84 |
| Ammonia (28%) | 1.09 |
| CC-700 | 120.90 |
| Ti-Pure ™ R-706 | 199.49 |
| NS-30 | 157.17 |
| Letdown | |
| Latex 2 | 314.36 |
| Texanol | 12.09 |
| Tego ™ Foamex 825 | 1.21 |
| Water | 21.86 |
| Total | 1000.00 |
| *Paint characteristics* | |
| PVC | 45% |

Paint 5

A paint containing aqueous dispersion of polymer-encapsulated pigment Dispersion 3 was prepared using the following procedure to form the aqueous coating composition Paint 5. The ingredients listed in Table 8 (grind) were mixed using a high speed Cowles disperser. The ingredients listed in Table 8 (let down) were added using a conventional lab mixer. The PVC of the resulting paints is 75%.

TABLE 8

75% PVC Aqueous Coating Composition

| Material | Weight(g) |
|---|---|
| Paint 5 Formulation | |
| Grind | |
| Water | 121.86 |
| Propylene Glycol | 12.69 |
| Orotan ™ 731A | 10.00 |
| Triton ™ EF-106 | 5.14 |
| Acrysol ™ DR-72 | 25.37 |
| Ammonia (28%) | 10.15 |
| CC-700 | 253.71 |
| Bindzil ® CC-40 | 329.82 |
| Letdown | |
| Dispersion 3 | 224.22 |
| Texanol | 4.48 |
| Tego ™ Foamex 825 | 2.56 |
| Total | 1000.00 |
| Paint characteristics | |
| PVC | 75% |

Paint 6 (Comparative Paint)

A paint containing no polymer-encapsulated pigment was prepared using the following procedure to form the aqueous coating composition Paint 6. The ingredients listed in Table 9 (grind) were mixed using a high speed Cowles disperser. The ingredients listed in Table 9 (let down) were added using a conventional lab mixer. The PVC of the resulting paints is 75%.

TABLE 9

75% PVC Aqueous Coating Composition

| Material | Weight(g) |
|---|---|
| Paint 6 Formulation | |
| Grind | |
| Water | 152.50 |
| Propylene Glycol | 12.69 |
| Orotan ™ 731A | 13.00 |
| Triton ™ EF-106 | 5.14 |
| Acrysol ™ DR-72 | 25.37 |
| Ammonia (28%) | 10.15 |
| Ti-Pure ™ R-706 | 73.99 |
| CC-700 | 253.71 |
| Bindzil ® CC-40 | 329.82 |
| Letdown | |
| Latex 3 | 116.59 |
| Texanol | 4.48 |
| Tego ™ Foamex 825 | 2.56 |
| Total | 1000.00 |
| Paint characteristics | |
| PVC | 75% |

IV. Results of Viscosity Stability of Aqueous Coating Compositions

Table 10 lists the viscosity of Paint 1 to Paint 6.

TABLE 10

| Paint ID | PVC of the coating composition | Stormer Viscosity, KU$^f$ | | Heat Age Viscosity, KU$^g$ | | Delta KU$^h$ |
|---|---|---|---|---|---|---|
| | | Initiate | Equilibrated | Initiate | Equilibrated | |
| 1 | 25% | 88 | 93 | 93 | 88 | −5 |
| 2$^i$ | 25% | 90 | 96 | 98 | 135 | 37 |
| 3 | 45% | 92 | 99 | 103 | 110 | 7 |
| 4$^i$ | 45% | 85 | 93 | 95 | 121 | 26 |
| 5 | 75% | 86 | 91 | 93 | 99 | 6 |
| 6$^i$ | 75% | 85 | 94 | 97 | 129 | 32 |

$^f$Stormer Viscosity was measured in 500 ml can;
$^g$Heat Age Viscosity was measured in 200 ml can;
$^h$Delta KU is the KU changes after heat age.
$^i$Paint 2, 4, or 6 is comparative example with TiO$_2$ un-encapsulated in the dispersions; the compositions of it are listed above.

The results in the above table indicate that aqueous dispersions of polymer encapsulated pigment play an important role to improve the paint viscosity stability of aqueous coating composition which contains colloidal silica. When aqueous dispersion of polymer encapsulated pigment exists, the KU changes after heat-age is within 10. While art pigments were used, the KU changes after heat-age would exceed 20. Overall, in the aqueous coating composition which contains colloidal silica, aqueous dispersions of polymer encapsulated pigments can improve paint viscosity.

The invention claimed is:

1. An aqueous coating composition comprising:
   i) a stable aqueous dispersion of polymer particles having structural units of an ethylenically unsaturated nonionic monomer;
   ii) from 5% to 50% by dry weight based on the total weight of the coating composition, of at least one pigment, wherein the pigment comprises from 30% to 100% based on the total weight of the pigment, of a polymer-encapsulated pigment comprising an encapsulating polymer comprising structural units of an ethylenically unsaturated nonionic monomer, and in percentage by weight based on the dry weight of the encapsulating polymer, from 0.1% to 10% of structural units of an ethylenically unsaturated monomer with at least one functional group selected from the group consisting of carboxyl, carboxylic anhydride, hydroxyl, amide, amine, sulphonate, phosphonate and mixtures thereof; wherein the polymer-encapsulated pigment has an average shell thickness of 10 nanometers to 200 nanometers and a minimum film formation temperature (MFFT) from −35° C. to 60° C.; and
   iii) from 2% to 25% by dry weight based on the total weight of the coating composition, of at least one colloidal silica.

2. The aqueous coating composition according to claim 1, wherein the encapsulating polymer further comprises, from 0.1% to 5% by dry weight of the encapsulating polymer, of at least one surfactant.

3. The aqueous coating composition according to claim 1, wherein the pigment is an inorganic pigment.

4. The aqueous coating composition according to claim 1, wherein the pigment is TiO$_2$, and at least 30% of the said TiO$_2$ is polymer encapsulated.

5. The aqueous coating composition according to claim 1, wherein the colloidal silica is derived from precipitated silica, micro silica, pyrogenic silica, silica gels, or a mixture thereof.

6. The aqueous coating composition according to claim 1, wherein the pigment is an inorganic pigment.

7. The aqueous coating composition according to claim 6, wherein the pigment is $TiO_2$, and at least 30% of the said $TiO_2$ is polymer encapsulated.

8. The aqueous coating composition according to claim 1, wherein the pigment is an inorganic pigment.

9. The aqueous coating composition according to claim 8, wherein the pigment is $TiO_2$, and at least 30% of the said $TiO_2$ is polymer encapsulated.

10. The aqueous coating composition according to claim 1, wherein the pigment is an inorganic pigment.

11. The aqueous coating composition according to claim 10, wherein the pigment is $TiO_2$, and at least 30% of the said $TiO_2$ is polymer encapsulated.

12. The aqueous coating composition according to claim 2, wherein the pigment is an inorganic pigment.

13. The aqueous coating composition according to claim 12, wherein the pigment is $TiO_2$, and at least 30% of the said $TiO_2$ is polymer encapsulated.

* * * * *